US010173528B2

(12) United States Patent
Gromotka et al.

(10) Patent No.: US 10,173,528 B2
(45) Date of Patent: Jan. 8, 2019

(54) METHOD FOR CORRECTING A STATE OF CHARGE OF A STATE OF CHARGE DISPLAY

(71) Applicant: Dr. Ing. h.c. F. Porsche Aktiengesellschaft, Stuttgart (DE)

(72) Inventors: Philipp Gromotka, Peine (DE); Emmanuel Dhollande, Sachsenheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 10 days.

(21) Appl. No.: 15/704,961

(22) Filed: Sep. 14, 2017

(65) Prior Publication Data
US 2018/0079303 A1 Mar. 22, 2018

(30) Foreign Application Priority Data

Sep. 16, 2016 (DE) .................. 10 2016 117 440

(51) Int. Cl.
*B60K 35/00* (2006.01)
*B60L 11/18* (2006.01)

(52) U.S. Cl.
CPC .......... *B60K 35/00* (2013.01); *B60L 11/1861* (2013.01); *B60K 2350/106* (2013.01); *B60K 2350/1076* (2013.01); *B60K 2350/901* (2013.01); *B60K 2350/965* (2013.01); *B60L 2240/14* (2013.01); *B60L 2240/62* (2013.01); *B60L 2250/16* (2013.01); *B60L 2250/22* (2013.01); *B60Y 2200/91* (2013.01); *B60Y 2302/03* (2013.01); *B60Y 2400/112* (2013.01)

(58) Field of Classification Search
None
See application file for complete search history.

(56) References Cited

U.S. PATENT DOCUMENTS 5,598,087 A * 1/1997 Hara .................. B60L 11/1862
320/DIG. 21
5,697,466 A * 12/1997 Moroto .................. B60K 6/365
180/65.25
8,063,757 B2 * 11/2011 Frey ...................... B60L 3/0069
340/438

(Continued)

FOREIGN PATENT DOCUMENTS

DE 102007025531 A1 12/2008
DE 102014201863 A1 8/2015

(Continued)

OTHER PUBLICATIONS

German Search Report with partial English translation for German Application No. 10 2016 117 440.8, dated Jul. 6, 2017—13 Pages.

(Continued)

*Primary Examiner* — Chico A Foxx
(74) *Attorney, Agent, or Firm* — RatnerPrestia

(57) ABSTRACT

A method for correcting a state of charge of a state of charge display of a traction battery of an electrically driven vehicle. The method includes detecting an attentiveness parameter of a driver of the vehicle with respect to the state of charge display, and step correction of the state of charge displayed on the state of charge display if the attentiveness parameter undershoots an attentiveness threshold value.

10 Claims, 4 Drawing Sheets

(56) References Cited

U.S. PATENT DOCUMENTS

| | | | | |
|---|---|---|---|---|
| 8,359,153 B2* | 1/2013 | Jinno | ...................... | B60K 6/445 |
| | | | | 701/123 |
| 8,403,086 B1* | 3/2013 | Free | ......................... | B60K 6/36 |
| | | | | 180/65.21 |
| 8,742,907 B2* | 6/2014 | Matsumoto | ......... | B60L 11/1816 |
| | | | | 320/137 |
| 9,244,527 B2* | 1/2016 | Lathrop | ................... | G06F 3/013 |
| 9,533,690 B2 | 1/2017 | Kassner et al. | | |
| 2006/0185917 A1* | 8/2006 | Ozeki | ................... | B60W 10/06 |
| | | | | 180/65.23 |
| 2012/0112754 A1* | 5/2012 | Kawai | ................ | G01R 31/3651 |
| | | | | 324/428 |
| 2013/0218402 A1* | 8/2013 | Hoshihara | ........... | B60L 11/1838 |
| | | | | 701/32.3 |
| 2014/0292665 A1* | 10/2014 | Lathrop | ................... | G06F 3/013 |
| | | | | 345/173 |
| 2016/0250944 A1 | 9/2016 | Christ et al. | | |
| 2016/0264013 A1* | 9/2016 | Kim | .................... | B60L 11/1848 |
| 2017/0021726 A1* | 1/2017 | Kim | ........................ | B60K 37/02 |
| 2017/0028866 A1* | 2/2017 | Miller | ................ | B60L 11/1861 |

FOREIGN PATENT DOCUMENTS

| | | | | |
|---|---|---|---|---|
| DE | 102015203491 A1 | | 9/2016 | |
| EP | 2489990 A1 * | | 8/2012 | ......... B60L 11/1861 |

OTHER PUBLICATIONS

EV Expert Says Nissan Leaf's Dashboard Lacks Most Number, Dec. 20, 2010, dowdloaded from http://www.plugincars.com/ev-expert-says-nissan-leaf-dashboard-lacks-most-important-number-106590.html [abgerufen am Mar. 7, 2017].

* cited by examiner

METHOD FOR CORRECTING A STATE OF CHARGE OF A STATE OF CHARGE DISPLAY

CROSS-REFERENCE TO RELATED APPLICATIONS

This application claims priority to German Patent Application No. 10 2016 117 440.8, filed Sep. 16, 2016, the content of such application being incorporated by reference herein in its entirety.

FIELD OF THE INVENTION

The present invention relates to a method for correcting a state of charge of a state of charge display of a traction battery of an electrically driven vehicle and to a corresponding correction device for correcting such a state of charge.

BACKGROUND OF THE INVENTION

It is known that traction batteries are provided in electric vehicles in order to make available the electrical energy for driving the electrically driven vehicles. A state of charge display is usually arranged in such vehicles in order to provide the driver with information about the current state of charge of the traction battery. The state of charge display is frequently provided in the region of the instrument panel and indicates the state of charge of the traction battery. The information about the correct state of charge is important for the driver. In this way, with reference to the state of charge, he can assess how large the remaining range of his vehicle is on the basis of the state of charge. He can also draw conclusions about the current driving style or the efficiency with respect to the consumption of energy with this driving style.

It is disadvantageous for the known solutions that during the operation of the vehicle, that is to say during travel, the state of charge of the battery can be determined only in an integrative fashion. The longer this integrative determination lasts and therefore the longer the vehicle is traveling, the greater the extent by which this integrative determination can deviate from the correct state of charge of the traction battery. The correct state of charge of the traction battery can be determined essentially exclusively in the stationary state of the vehicle by the determination of the open-circuit voltage of the traction battery. As soon as a corrected version, and therefore the correct state of charge, has been detected, sliding approximation of the displayed state of charge to the correct state of charge takes place in the known solutions. This is carried out since a displayed step in the displayed state of charge would involve a surprise effect for the driver of the vehicle. This is to be avoided in order to maintain the driver's trust in the displayed state of charge of the state of charge display. However, this leads to a situation in which over a relatively long time of the approximation between the correct state of charge and the displayed state of charge the driver receives at least partially incorrect information about the state of charge of the traction battery.

SUMMARY OF THE INVENTION

The object of the present invention is to at least partially overcome the disadvantages described above. In particular, the object of the present invention is to permit, in a cost-effective and simple way, a step increase for the purpose of correcting the state of charge on the state of charge display.

The above object is achieved by means of a method having the features of claim 1 and a correction device having the features of claim 10. Further features and details of the invention can be found in the dependent claims, the description and the drawings. In this context, features and details which are described in conjunction with the method according to aspects of the invention apply, of course, also in relation to the correction device according to aspects of the invention, and respectively vice versa, and therefore reference is always made, and can always be made, to the disclosure of the individual aspects of the invention in a reciprocal fashion.

A method according to aspects of the invention serves to correct a state of charge of a state of charge display of a traction battery of an electrically driven vehicle, comprising the following steps:
detecting an attentiveness parameter of a driver of the vehicle with respect to the state of charge display, and
step correction of the state of charge value displayed on the state of charge display if the attentiveness parameter undershoots an attentiveness threshold value.

A method according to aspects of the invention is actually also intended to overcome the problem that a displayed state of charge on a state of charge display does not correspond to the correct state of charge of the traction battery. The basic problem therefore corresponds to the problem in the prior art. However, according to aspects of the invention another form of correction is actually selected. Accordingly, a step change is to be carried out. A step correction is to be understood in the sense of the present invention as meaning a correction of the state of charge display which particularly does not take place in a sliding or continuous fashion. If, for example, the displayed state of charge is in the region of approximately 60% on the state of charge display and the correct state of charge is in the region of 45%, in the prior art the state of charge would drop more quickly from 60% to 45% over an approximation time period in order to carry out the correction. In contrast to this, according to aspects of the invention a step correction is actually carried out to the effect that in one step or a small number of steps the correct value of the state of charge is displayed immediately, or essentially immediately, on the state of charge display by the correction. In other words, the displayed state of charge jumps from the incorrect 60% directly, or in a small number of steps, to the correct 45%.

As a result of the rapid jumping, it is possible to avoid an undesirably long time period in which the driver drives with incorrect information about the state of the charge of the traction battery. However, at the same time this step correction is carried out according to a condition. This condition relates to the attentiveness parameter.

An attentiveness parameter is understood within the sense of the present invention to be a value which represents the attentiveness of the driver with respect to the state of charge display. Such an attentiveness parameter is in the simplest case the viewing direction of the driver in the direction of the instrument panel or in the direction of the state of charge display. Therefore, the viewing direction of the driver is detected, for example, by means of what is referred to as fatigue monitoring. In this way, blinking, closing of the eyes or similar behavior of the driver can also be detected. From this information it is also possible to determine an attentiveness parameter. In the case of the viewing direction and in the simplest case the attentiveness parameter can be a digital qualitative statement, that is to say the statement as to whether the driver is looking in the direction of the state of charge display or not. Therefore, if the driver is located in the vehicle with a viewing direction which points away from the state of charge display, the attentiveness parameter is low, in particular equal to 0. If the driver looks at the state of charge display, the attentiveness parameter is therefore high and correspondingly preferably equal to 1. As a result of the comparison of such an easily determinable, and in particular easily processable attentiveness parameter with a corresponding attentiveness threshold value it is then possible to ensure that the step correction takes place only when the attentiveness of the driver is directed at the state of charge display only to a small extent or not at all.

The present description is just one example of the attentiveness parameter. Of course, combinations of qualitative or also quantitative information can also be included in the attentiveness parameter. A purely quantitative evaluation with respect to a precise number for the attentiveness parameter and the associated attentiveness threshold value is also conceivable within the sense of the present invention and will be explained in more detail later.

The decisive advantage is then achieved according to aspects of the invention to the effect that a step correction becomes possible without the driver having to consciously experience this step correction. This overcomes the disadvantage of known solutions that namely an incorrect display of the state of charge on the state of charge display has to be accepted over a certain period of time. At the same time, this disadvantage is overcome without adversely affecting the driver's trust in the correctness of the state of charge display.

It may be advantageous if in a method according to aspects of the invention the step correction of the displayed state of charge takes place in a single step to a correct state of charge. This means that this correction is not carried out in a plurality of individual steps but rather in a single rapid step. In other words, a correction takes place in a single operation so that short phases of reduced attentiveness of the driver are already sufficient to carry out the desired correction in a stepped fashion. This is, as it were, the most rapid solution for carrying out a method according to aspects of the invention.

It can also be advantageous if in a method according to aspects of the invention the attentiveness parameter includes at least one of the following sensor values:
  viewing direction of the driver
  duration of the viewing direction of the driver
  acceleration behavior of the vehicle
  speed of the vehicle
  occupation of the driver's seat
  geolocation of the vehicle.

The above enumeration is not a conclusive list. Of course, different sensor values can also be connected together in one attentiveness parameter, and a single attentiveness parameter therefore represents two or more sensor values. The viewing direction of the driver has already been explained as a sensor value for the attentiveness parameter. However, it may also be appropriate additionally also to include the duration of the viewing direction of the driver. It may therefore be appropriate to permit the step correction to be carried out only when the driver has no longer looked at the state of charge display for a certain time period. The acceleration behavior can also provide conclusive information about the driver's attentiveness. If a driver brakes strongly or is in an acceleration phase, the driver's attention will therefore tend to be directed at the surroundings and the vehicle rather than at the state of charge display. The same also applies to the overall speed of the vehicle. In particular in the case of a stationary vehicle a step correction is to be avoided since then the driver does not experience any distraction by the current driving situation of the vehicle. This information from the attentiveness parameter correlates, in particular, with the geolocation of the vehicle at which the traffic light phase or traffic light positions can be correlated. Last but not least, the occupation of the driver's seat makes available conclusive information for the attentiveness parameter. It is therefore possible, for example in the case of a running engine but a driver's seat which is not occupied, for the desired step correction to take place immediately since there is no fear of any attentiveness at all on the part of the driver.

A further advantage may be if in a method according to aspects of the invention the step correction of the displayed state of charge is carried out only if a difference between a correct state of charge and the displayed state of charge exceeds a differential threshold value. It is to be understood here that a step correction occurs only if there is also a large difference. In the case of small differences, which accordingly include a lower risk of incorrect information, it is possible to have recourse to the normal method of the sliding correction. However, if a large difference is already present between the displayed state and the corrected state of charge, the method according to aspects of the invention for step correction is applied.

A further advantage is if in a method according to aspects of the invention the step correction of the displayed state of charge is carried out only if the correct state of charge of the traction battery is below a battery threshold value. The battery threshold value can also be referred to as a limiting range of the battery. In particular in the operational range of the traction battery which is associated with strong discharging, that is to say preferably in the case of a correct state of charge of less than 20%, correct information to the driver about the actual and correct state of charge is of decisive importance. The step correction is therefore carried out, in particular, if the correct state of charge of the traction battery is below such a battery threshold value. Such an embodiment of the method can, of course, be freely combined with other embodiments or can also include an otherwise normal sliding approximation for the purpose of correction.

Furthermore, it may be advantageous if in a method according to aspects of the invention the step correction of the displayed state of charge is carried out only if the correct state of charge is below the displayed state of charge. It is to be considered a risky situation, in particular, if the driver of the vehicle believes that he still has a higher state of charge available in the traction battery than is actually the case. Therefore, in particular in this case, that is to say if the correct state of charge of the traction battery is below the displayed state of charge, a step correction involves the advantages which have already been explained. Otherwise, a normal method can also be used again or the correlation with other embodiments of the invention can be carried out.

It is a further advantage if in a method according to aspects of the invention the step correction of the displayed state of charge is carried out only if the attentiveness parameter is below the attentiveness threshold value over a defined attentiveness time. Attentiveness time is therefore the duration for which an attentiveness parameter is below the attentiveness threshold value. This means that the step correction is not carried out immediately if the attentiveness parameter sinks below the attentiveness threshold value but rather only after the defined attentiveness time. This avoids a situation in which the driver remembers, as it were, the last attentiveness and is, as it were, subsequently surprised by the step correction when he next looks at the state of charge display.

It can be a further advantage if in a method according to aspects of the invention the step correction of the displayed state of charge does not exceed a maximum difference. Even when there are large differences between the correct state of charge and the displayed state of charge, the correction is therefore carried out in a stepped fashion. Each of these steps includes, however, a step correction of the displayed state of charge, wherein the maximum difference at each of these individual steps is not exceeded. The maximum difference can therefore also be understood to be a maximum step width of the step correction.

It can be a further advantage if in a method according to aspects of the invention the step correction of the displayed state of charge is carried out only if the interval time from a preceding step correction of the displayed state of charge is above an interval threshold value. This is to be understood as meaning that it is only possible to carry out the step correction at all at certain intervals. If a step correction were carried out within a certain time interval, it would no longer be possible to carry out any further step correction for the defined time of the interval time. This means that the driver would not be confused or unsettled by a large number of step corrections in a very short time.

A correction device for correcting a state of charge of a state of charge display of a traction battery of an electrically driven vehicle is also a subject matter of the present invention. Such a correction device comprises a detection module for detecting an attentiveness parameter of a driver of the vehicle with respect to the state of charge display. Furthermore, a correction module for the step correction of the state of charge displayed on the state of charge display is provided if the attentiveness parameter undershoots an attentiveness threshold value. The detection module and the correction module are designed, in particular, to carry out a method according to aspects of the so invention. Therefore, a correction device according to aspects of the invention provides the same advantages as those which have been described in detail with respect to a method according to aspects of the invention.

BRIEF DESCRIPTION OF THE DRAWINGS

Further advantages, features and details of the invention can be found in the following description in which exemplary embodiments of the invention are described in detail with reference to the drawings. In this context, the features which are mentioned in the claims and in the description can each be essential to the invention individually per se or in any desired combination. Schematically in the drawings:

DETAILED DESCRIPTION OF THE INVENTION

Figure 1:
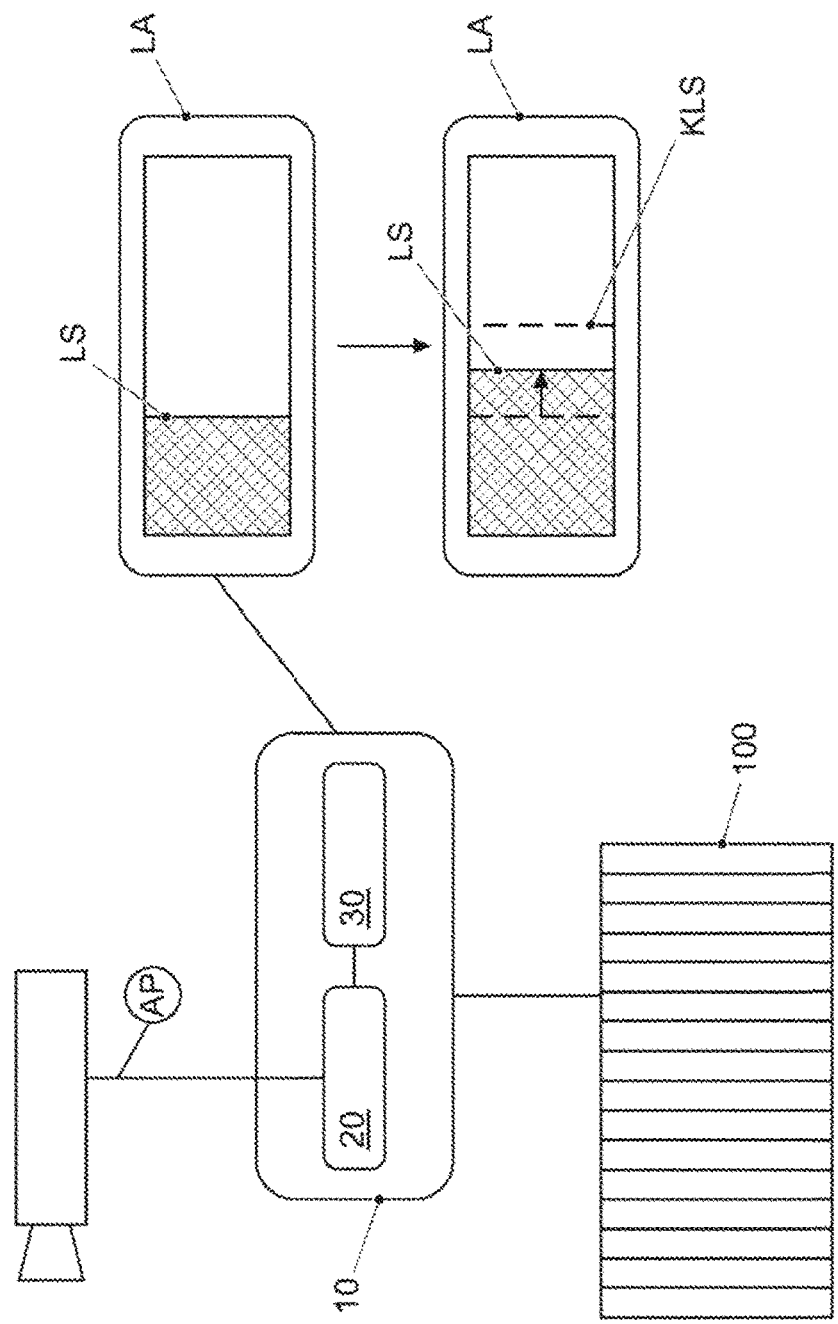
FIG. 1 shows a correction device for carrying out a method according to aspects of the invention.

FIG. 1 is a schematic view of how a traction battery 100 can be connected to a correction device 10 according to aspects of the invention. In the interior of a vehicle there is a state of charge display LA which is embodied here as a bar display. In a first state, which is illustrated as a state of charge display LA, a state of charge LS is displayed. If the correction device 10 then determines from this that a correct state of charge KLS is different from the displayed state of charge LS, an attentiveness parameter AP is detected in parallel with the detection module 20, here by means of a camera. As soon as this attentiveness parameter AP is below an attentiveness threshold value AS, a step correction of the displayed state of charge LS to the correct state of charge KLS is carried out using the correction module 30, with the result that the state of charge display LA changes in stepped fashion to the lower illustration.

Figure 2:
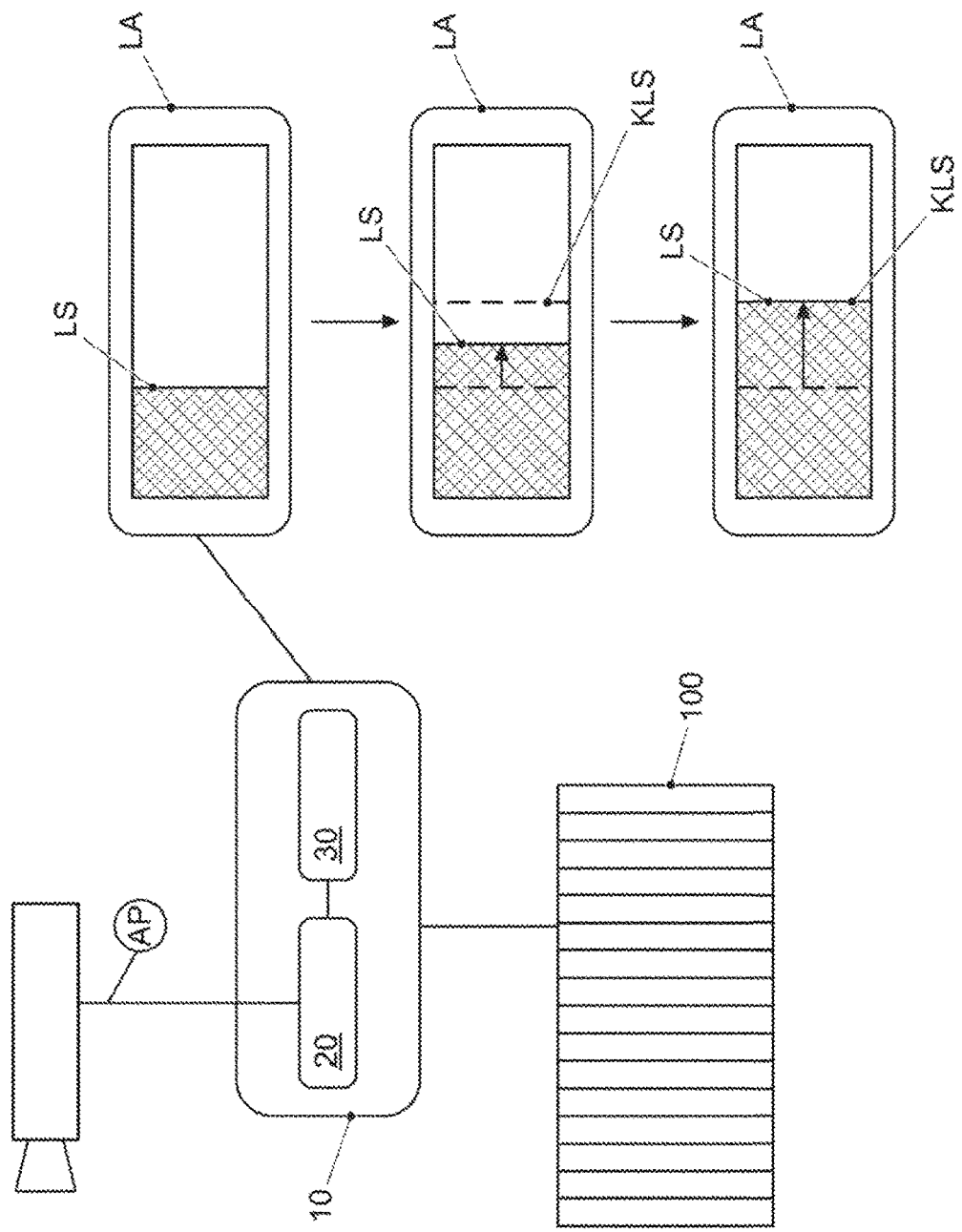
FIG. 2 shows the embodiment in FIG. 1 in an alternative method.

FIG. 2 shows a development of the embodiment of FIG. 1. Therefore, the correction is carried out in two steps here, with the result that a maximum step width as a maximum difference for each step correction is not exceeded. However, ultimately in the bottom illustration of the state of charge display LA the correct state of charge KLS is also again displayed as the state of charge LS.

Figure 3:
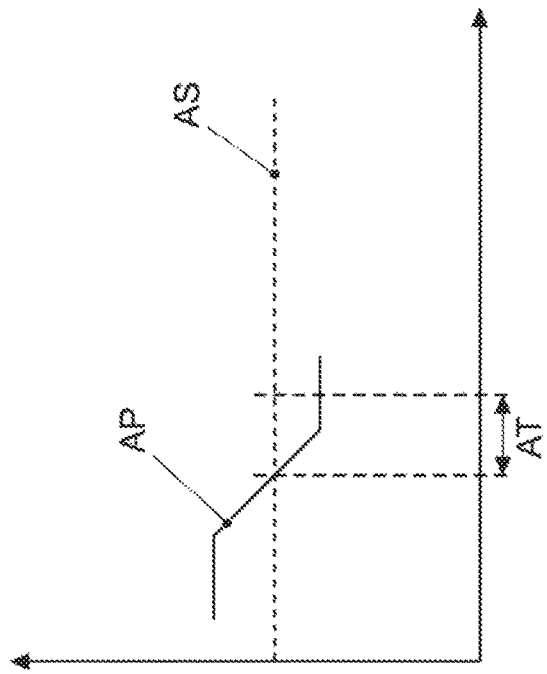
FIG. 3 shows a diagram for carrying out a method according to aspects of the invention.

FIG. 3 shows how the correlation between the attentiveness parameter AP and the attentiveness threshold value AS is to be understood. In this context there may be provision that the step correction is not carried out until the attentiveness parameter AP is arranged below the attentiveness threshold value AS over a certain attentiveness time AT.

Figure 4:
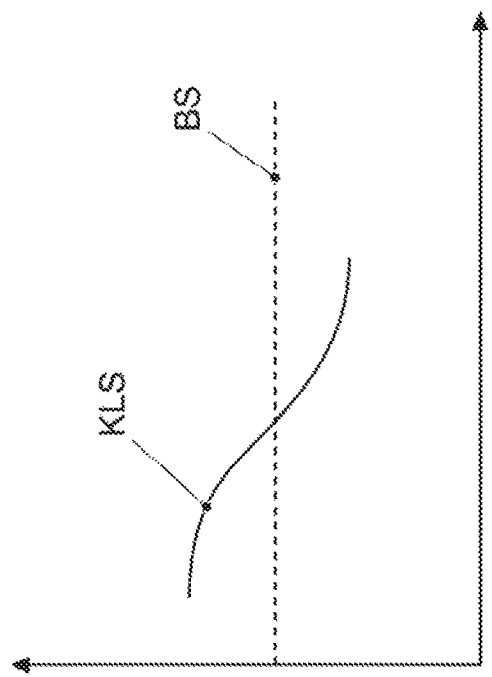
FIG. 4 shows a further diagram for carrying out a method according to aspects of the invention.

FIG. 4 shows that the correct state of charge KLS must preferably be below a battery threshold value BS, with the result that the step correction can only be carried out in this limiting range.

Figure 5:
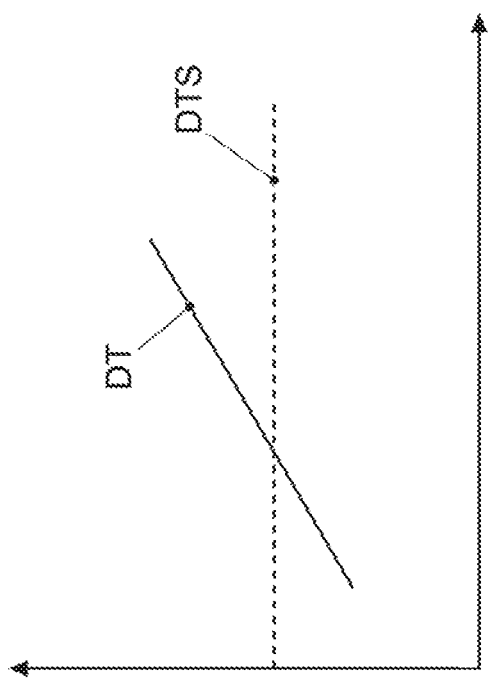
FIG. 5 shows a further diagram for carrying out a method according to aspects of the invention.

FIG. 5 shows a possible way of how the interval time DT between two step corrections which are carried out must be above an interval threshold value DTS in order to carry out the step correction a further time.

The above explanation of the embodiments describes the present invention exclusively within the scope of examples. Of course, individual features of the embodiments can, where technically appropriate, be combined freely with one another without departing from the scope of the present invention.

What is claimed is:

1. A method for correcting a displayed state of charge of a state of charge display of a traction battery of an electrically driven vehicle, comprising the following steps;
    detecting a current state of charge of the traction battery;
    determining that the current state of charge is different than the displayed state of charge;
    detecting an attentiveness parameter of a driver of the vehicle with respect to the state of charge display, and
    step correcting the displayed state of charge displayed on the state of charge display to the detected current state of charge if the attentiveness parameter is below an attentiveness threshold value.

2. The method as claimed in claim 1, wherein the step correcting of the displayed state of charge comprises displaying the current state of charge as the displayed state of charge in a single step when the attentiveness parameter is below the attentiveness threshold value.

3. The method as claimed in claim 1, wherein the attentiveness parameter includes at least one of the following sensor values:
    viewing direction of the driver, indicating whether the driver is currently looking at the state of charge display;
    duration of the viewing direction of the driver, indicating amount of time since the driver last looked at the state of charge display;

acceleration behavior of the vehicle, indicating focus of the driver on surroundings versus the state of charge display;

speed of the vehicle, indicating of the driver on surroundings versus the state of charge display;

occupation of the driver's seat, indicating presence of the driver in the vehicle in order to view the state of charge display; or geolocation of the vehicle, indicating focus of the driver on surroundings versus the state of charge display.

4. The method as claimed in claim 1, wherein the step correcting of the displayed state of charge is carried out only if a difference between a correct state of charge and the displayed state of charge exceeds a differential threshold value.

5. The method as claimed in claim 1, wherein the step correcting of the displayed state of charge is carried out only if the correct state of charge of the traction battery is below a battery threshold value.

6. The method as claimed in claim 1, wherein the step correcting of the displayed state of charge is carried out only if the correct state of charge is below the displayed state of charge.

7. The method as claimed in claim 1, wherein the step correcting of the displayed state of charge is carried out only if the attentiveness parameter is below the attentiveness threshold value over a defined attentiveness time.

8. The method as claimed in claim 1, wherein the step correcting of the displayed state of charge does not exceed a maximum difference.

9. The method as claimed in claim 1, wherein the step correcting of the displayed state of charge is carried out only if an interval time from a preceding step correcting of the displayed state of charge is above an interval threshold value.

10. A correction device for correcting a state of charge of a state of charge display of a traction battery of an electrically driven vehicle, comprising a detection module for detecting an attentiveness parameter of a driver of the vehicle with respect to the state of charge display, and a correction module for step correction of the state of charge displayed on the state of charge display if the attentiveness parameter undershoots an attentiveness threshold value, wherein the detection module and the correction module are designed to carry out a method having including the steps of claim 1.

* * * * *